(12) United States Patent
Jaycox et al.

(10) Patent No.: US 8,851,798 B1
(45) Date of Patent: Oct. 7, 2014

(54) HIGH TRAVEL FLOATING DOCK HINGE

(71) Applicants: Jeffrey S. Jaycox, Virginia Beach, VA (US); Bradley A. Reid, South Mills, NC (US); Christopher S. Flint, Portsmouth, VA (US)

(72) Inventors: Jeffrey S. Jaycox, Virginia Beach, VA (US); Bradley A. Reid, South Mills, NC (US); Christopher S. Flint, Portsmouth, VA (US)

( * ) Notice: Subject to any disclaimer, the term of this patent is extended or adjusted under 35 U.S.C. 154(b) by 0 days.

(21) Appl. No.: 13/926,062

(22) Filed: Jun. 25, 2013

(51) Int. Cl.
*B63B 35/44* (2006.01)
*F16C 11/04* (2006.01)

(52) U.S. Cl.
CPC ............... *F16C 11/04* (2013.01); *B63B 35/44* (2013.01)
USPC .............................. 405/220; 16/392; 114/353

(58) Field of Classification Search
CPC ......... E02B 3/064; B63B 35/36; E01D 15/14; E05D 3/10
USPC ...................... 405/220; 114/353; 16/389, 392
See application file for complete search history.

(56) References Cited

U.S. PATENT DOCUMENTS

| | | | |
|---|---|---|---|
| 3,421,327 A | 1/1969 | Donaldson |
| 4,453,488 A | 6/1984 | Watchorn et al. |
| 4,683,833 A | 8/1987 | Meriwether |
| 4,979,453 A | 12/1990 | Easson et al. |
| 5,605,344 A | 2/1997 | Insalaco et al. |
| 6,257,164 B1 | 7/2001 | Carey |
| 6,890,120 B2 | 5/2005 | Hozie |
| 7,603,733 B2 | 10/2009 | Laverman et al. |
| 7,681,271 B2 | 3/2010 | Muhl et al. |

*Primary Examiner* — Tara M. Pinnock
(74) *Attorney, Agent, or Firm* — David L. Banner (57) ABSTRACT

A hinge connector for connecting adjoining floating dock sections formed from a pair of hinge halves. Each hinge half has a top flat surface, a downwardly directed leg having a lower leg portion. A plurality of hinge knuckle loops is formed on each leaf and hinge pin sleeve sections are fastened therein. When the two hinge leaves are brought together with their respective hinge knuckle loops/hinge pin sleeve sections interleaved and aligned, a hinge pin is inserted axially through the hinge pin sleeve sections, the two hinge halves are each free to rotate around the hinge pin. An orthogonal relationship exists between the top flat surface and the lower leg portion of the downwardly directed leg portion. This allows the floating dock hinge to be connected to both a horizontal surface such as the top deck of a floating and a vertical surface such as the edge of a floating dock module to maximize the strength of the hinged joint between modules.

11 Claims, 11 Drawing Sheets

Figure 1A

PRIOR ART

HIGH TRAVEL FLOATING DOCK HINGE

FIELD OF THE INVENTION

The invention pertains to a dock hinge method and apparatus and, more particularly, to a method and apparatus for connecting dock sections and the like to each other while allowing restricted independent movement of individual dock sections.

BACKGROUND OF THE INVENTION

Current dock hinges, for this application or similar applications, are simple devices with limited functionality and little concern for safety or aesthetics. Generally, the current hinge design consist of two flat plates with hinge portions (i.e., leaves) protruding outwards that are mounted opposite one another with the hinge portions being axially aligned and connected with a pin inserted through the hinge portions whereby the hinge portions are constrained in an axially rotating plane. The hinge is attached along the longitudinal gap between the fixed and movable dock sections. A fixed dock section is generally permanently attached to either a shoreline or a piling that has been set into the ground below the water. A floating dock hinge may attach between this permanent base and a free-floating dock section with a hinge that allows for the motion of water to cause up and down movement of the floating section independent of the fixed portion. The floating section may consist of docking sections, walkways, or other floating devices used in the docking industry. The hinges of the prior art function in the basic hinge sense but offer a limited amount of rotation from the lower binding point to the upper binding point of the assembly. They can also leave a large open gap between the two sections of dock that can both act as a trip hazard and a pinch point where serious injury could occur.

The following is a listing of United States patents that disclose various hinge methodologies. The citation thereof is not an acknowledgement that any are prior art to the present invention, nor a statement that an exhaustive search has been completed.

DISCUSSION OF RELATED ART

Many attempts have been made to overcome deficiencies of dock hinging methods and apparatus of the prior art. The existing prior art has provided an invention relating to the shelling of nuts, particularly such nuts as coconuts, as described in U.S. Pat. No. 7,603,733 for DOCK LEVELLER, LIP FOR DOCK LEVELLER AND LIP HINGE CONSTRUCTION, issued Oct. 20, 2009 to Layerman et. al., discloses a dock leveller comprising a deck plate having a deck upper surface, which deck plate is pivotably connectable with a platform having a lip upper surface forms at least a part of a transport surface; and a lip hinge construction with a pivot element which pivotably connects an end of the lip and an end of the deck plate of the dock leveller, characterized in that the upper surface of the lip, through the pivot element, is placeable at a positive angle or a negative angle relative to a position in line with the upper surface of the deck, being pivotable to both one side and the other side.

U.S. Pat. No. 7,681,271 for CONSTANT RADIUS DOCK LEVELER HINGE, issued Mar. 23, 2010 to Muhl et. al., discloses dock leveling system adapted to be disposed in a pit is disclosed. A hinge member with a hinge pin receiving area and a hinge pin disposed in the hinge member defines a center of rotation. A deck that is rotatable about the hinge pin includes a curved portion with a constant radius and a center of curvature substantially similar to the center of the hinge pin. The curved portion defines an elevation that remains constant as the deck rotates about the hinge pin.

U.S. Pat. No. 4,683,833 for HINGE CONNECTOR FOR FLOATING DOCK issued Aug. 4, 1987 to Meriwether, discloses a floating dock having individual dock sections pivotally interconnected by continuous metal hinge connectors to permit relative vertical pivoting movement between adjacent dock sections. The hinge connectors each comprise a pair of elongated metal hinge leafs pivotally interconnected by a pivot pin extending through aligned hinge loops on the hinge leafs. The hinge connectors are secured to adjoining spaced, parallel, portions of the respective dock sections with their pivot pins extending horizontally and lengthwise of the spacing therebetween and with the hinge leafs and their hinge loops bridging and closing the gap between the spaced dock sections at the level of their deck surfaces to form continuations thereof. The hinge leafs are preferably formed with depending side anchor leg portions for securing them to the dock sections, and their hinge loops are preferably located on their underside.

U.S. Pat. No. 4,979,453 for FLOATING DOCK SYSTEM issued Dec. 25, 1990 to Easson et. al., discloses a floating dock system of improved stability and load carrying capacity with a clean, uncluttered profile. The system is made of rectangular, modular main dock units having preferably cylindrical steel tanks or floats rigidly attached in parallel relation and supporting a deck structure. Individual units are attached together by hinges at the ends and have finger pier units, also preferably having cylindrical steel tanks or floats supporting a deck structure attached along the sides of the main dock units, as by hinges, so as to form mooring slips therebetween. The main dock units may have a utility trench built into the decking therealong which permit inspection thereof and may have transformers mounted on each unit to provide power sources of equivalent capacity along the entire main dock system.

U.S. Pat. No. 6,257,164 for DOCK JOINT STRUCTURE issued Jul. 10, 1999 to Carey, discloses a dock bridge to overlie a gap between two connected dock sections. The dock bridge includes two connector plates and a flexible material connected between the two connector plates. Each of the connector plates is made of a corrosion resistant material and the flexible material is made of a water resistant material. The flexible material includes a plurality of ribs positioned in a substantially parallel orientation and lying substantially parallel to the longitudinal axis of the dock bridge.

U.S. Pat. No. 6,890,120 for HINGE FOR DOCKS issued May 10, 2005 to Hozie, discloses hinge for interconnecting sections of a floating dock and for interconnecting walkways with floating docks. This hinge protects docks from being damaged by stress exerted by the side to side or up and down motion of the wave, storm or high winds. This hinge can also be used for reconstructing old damaged docks. The hinge comprises two stackable sheet of twisting members which are preferably flat, each having an arcuate front end for facilitating a twisting motion of the twisting members relative to each other, a mounting plate, and a central opening for accommodating a pivot rod; a fastener for keeping the hinge components together; and, preferably washers to protect the outside surfaces of the twisting members from abrasion. One side of the hinge preferably attaches to a dock section having a dock joint bracket while the other end preferably attaches to a plain corner bracket to allow vertical pivotal movement of the dock sections in response to wave motions. A cover is provided if a gap is formed by the space occupied by the hinge.

U.S. Pat. No. 3,421,327 for DOCK HINGE issued Jan. 14, 1969 to Donaldson, discloses a hinge for use with boat docks or the like comprising first and second hinge sections which are secured to the ends of first and second support members. The hinge sections are detachably secured together by pivoting one of the hinge sections with respect to the other hinge section whereby a pair of posts on one of the hinge sections will be received by a pair of slots on the other hinge section.

U.S. Pat. No. 4,453,488 for CONNECTOR FOR JOINING STRUCTURAL COMPONENTS issued Jun. 12, 1984 to Watchorn et. al., discloses a connector for joining structural components which may be subjected to bending, shear, tensional and/or torsional forces at the joint is comprised of a fixture member spanning the joint between the structural components for coupling the same along a longitudinal connector axis generally normal to the joint, socket members disposed within each of the components to be joined and through which the fixture member passes, the sockets defining a shear pocket configured to receive a resilient shear cushion. The fixture member is preferably a compressive fixture member and includes resilient compression cushion members disposed intermediate the length thereof outwardly proximate the shear pocket and inwardly proximate adjustable compression members for establishing a compressive force across the joint. A bending cushion may be disposed at the joint between the structural components.

U.S. Pat. No. 5,605,344 for TRANSPORT CART issued Feb. 25, 1997 to Insalaco et. al., discloses a cart for transporting materials along a floor having a base positioned parallel to the floor. Positioned above the base is a rectangular cover having a first side edge, a second side edge and a back edge defining three sides of a rectangle. A first side support, a second side support and a back support each extend from the base to the cover. Four vertical supports extend from the base to contact the cover at four points substantially aligned with a first diagonal of the rectangle.

None of the patents, taken singly, or in any combination are seen to teach or suggest the method and apparatus of a novel hinge for the attachment of floating dock sections to a permanent fixture.

The present invention represents a new and improved hinge attachment means between a permanently sited docking fixture and a floating dock section, whereby the hinge flange portions cover the gap between adjacent dock sections so the gap is not exposed, and in so doing prevents accidental pinching and/or entrapment of appendages and objects that are smaller than the gap between sections, while concomitantly allowing the moveable floating dock portion a large degree of available rotation. It is believed that such a structure represents a significant advancement in the art.

SUMMARY OF THE INVENTION

In accordance with the present invention there is provided a dock hinge suitable for connecting adjoining sections or modules of a floating dock system or the like. As used herein, the term "floating dock" is intended to encompass any similar floating structure such as floating walkways, etc. formed from sections joined one to another with a hinge allowing each section of the structure to move responsively to changing water conditions (e.g., waves, boat wakes, etc.).

The novel hinge has a pair of halves that have cross-sections that are essentially mirror images of one another when viewed from an end. The pair of hinge halves have a series of semi-circular hinge knuckle loops with hinge pin sleeve sections affixed therein, A hinge pin inserted in axially aligned hinge pin sleeve segments connects the pair of halves The flat upper surface of each hinge half may be fastened to the upper surface of a floating dock module while horizontally bridging and closing the gap between the dock sections at the level of the deck surfaces to effectively form a continuation of the deck surfaces, the secured hinge connector connecting the dock sections for up and down pivoting movement about the hinge pin. The leg portions of the hinge halves are typically attached to a vertical surface of a floating dock module.

A substantially smooth, near-flat upper deck surface with any gaps between floating dock modules minimized, presents a surface suitable for walking upon without a gap between mating sections of dock structure. Such a surface also allows easy transversal of a variety of personal locomotion devices, such as wheelchairs, walkers, scooters, golf carts, etc.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention is a novel dock hinge for connecting movable (i.e., floating) dock structures or the like, to similar other floating structures or to a fixed structure such as a dock, seawall, or other such structure. The novel hinge provides a nearly continuous horizontal planar face covering the opening between the two floating dock modules, thereby minimizing the possibility of a pinch point between floating dock modules. The novel hinge also provides a large degree of available rotation thereby allowing floating dock modules to move relative each other so as to compensate for up and/or down changes in the water level due to tides, boat traffic, waves, storm surges or the like. In addition, novel hinge presents a smooth, clean appearance to a dock, floating walkway, or other floating modules that are connected by the novel hinges. Consequently, both tripping and pinch hazards associated with dock hinges of the prior art are minimized or eliminated.

Figure 1A:
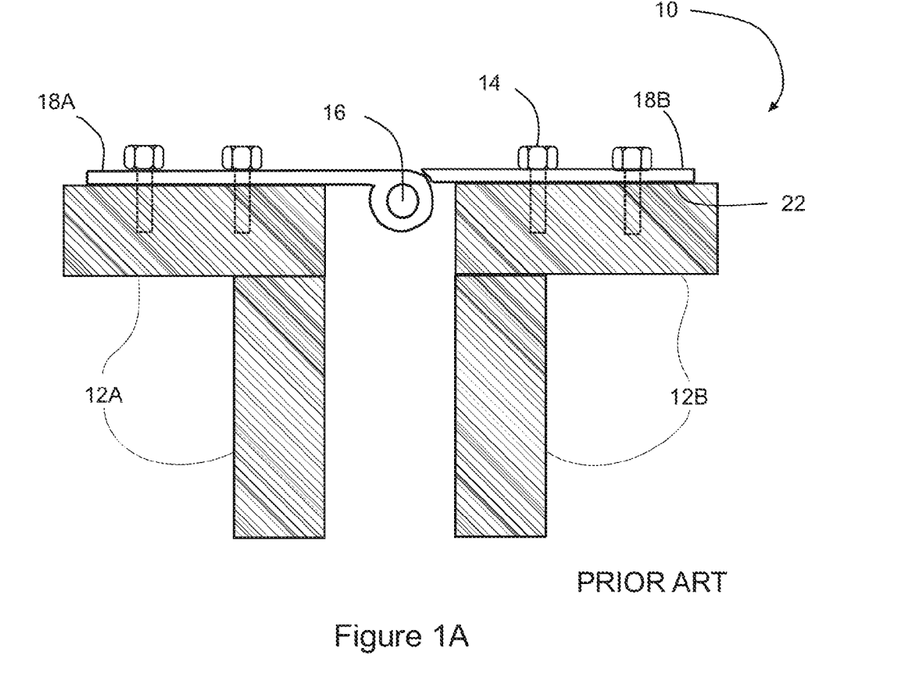
FIG. 1A is an end cross sectional view of a first dock hinge of prior art.

Referring first to FIG. 1A, there is shown an end cross sectional view of a first dock hinge of the prior art, generally at reference number 10. Dock hinge 10 has a pair of leaves 18A, 18B rotationally joined one to the other around a hinge pin 16. Leaves 18A, 18B are fastened to an upper surface of a pair of floating dock module 12A, 12B. It will be recognized by those of skill in the arts that one of the floating dock modules, for example, 12A may be a fixed member (e.g., a fixed dock section permanently attached to either a shoreline or a piling that has been set into the ground below the water, etc) to which a floating dock module, for example, 12B is hingedly attached.

Fasteners 14, typically screws, lag bolts, or nut-and-bolt fastening systems placed through holes, not specifically identified, in leaves 18A, 18B are used to fasten dock hinge 10 to floating dock modules 12A, 12B.

Figure 1B:
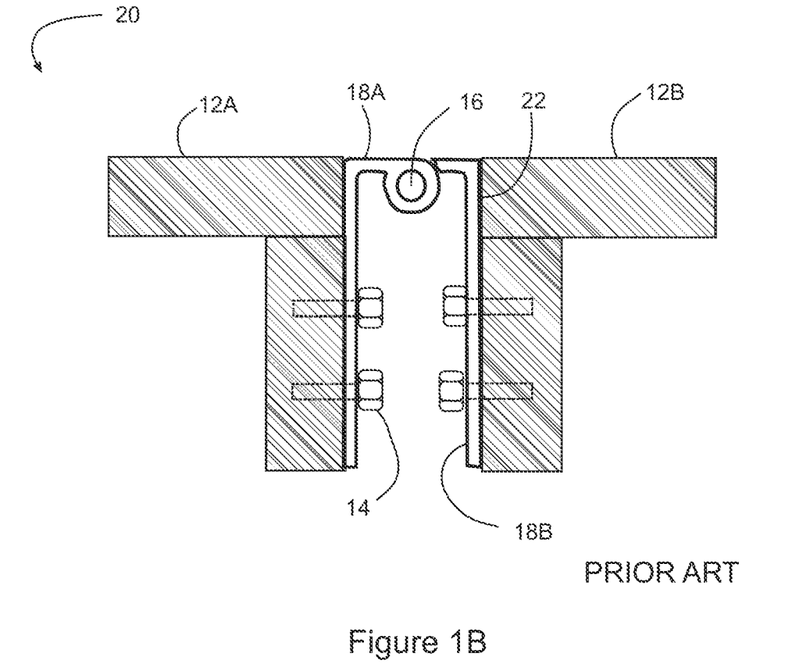
FIG. 1B is an end cross sectional view of a second dock hinge of prior art.

Referring now also to FIG. 1B, there is shown an end cross sectional view of a second dock hinge of the prior art, generally at reference number 20. Dock hinge 20 also has a pair of leaves 18A 18B rotationally joined one to the other around a hinge pin 16. However, leaves 18A, 18B are fastened to a vertical edge surface of a respective floating dock module 12A, 12B. It will be recognized by those of skill in the arts that one of the floating dock modules 12A, 12B may be a fixed member (e.g., a fixed dock section permanently attached to either a shoreline or a piling that has been set into the ground below the water, etc) to which a floating dock module 12A, 12B is hingedly attached. Such attachment was previously described.

Fasteners 14, typically screws or lag bolts placed through holes, not specifically identified, in leaves 18A, 18B are used to fasten dock hinge 20 to floating dock modules 12A, 12B, respectively.

As may be seen in FIGS. 1A and 1B, the leaves 18A, 18B or respective prior art dock hinges are attached to a single surface of a respective floating dock module 12A, 12B. This defines a single attachment plane for each leaf 18A, 18B. During extensive flexural events, such as during long periods of constant wind, the stresses at the attachment points between leaves 18A, 18B and respective surfaces of floating dock modules 12A, 12B may cause failure of the hinge joint. In one mode of failure, flexing of leaves 18A, 18B may cause fasteners 14 to be pulled out of floating dock modules 12A, 12B. A second mode of failure may occur at the point of attachment between leaves 18A, 18B at hinge pin 16.

Figure 2A:
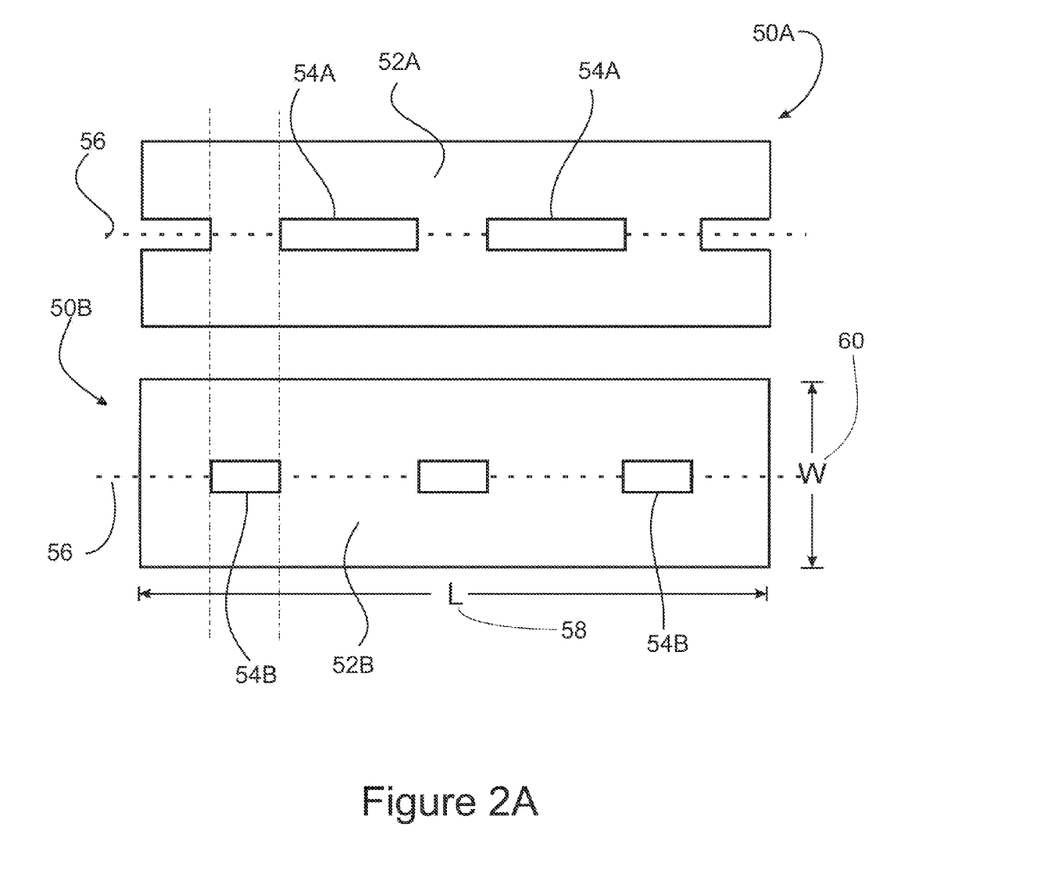
FIG. 2A is a top plan, schematic view of two flat portions of sheet stock prior to forming into two mirror images leaves of the floating dock hinge in accordance with the invention.

Referring now also to FIG. 2A, there is shown a top plan, schematic view of two flat portions of sheet stock 50A, 50B, respectively, prior to forming into two mirror images hinge halves 102A, 102B of the floating dock hinge 100 (FIG. 3) in accordance with the invention. Flat portions 50A, 50B each have a length "L" 58 and a width "W" 60, and a thickness "T" 62 (FIGS. 2C, 2D). Line 56 defines a major axis and width "W" 60 defines a minor axis of flat portions 50A, 50B.

Flat portions 50A, 50B have a series of openings 54A, 54B, respectively, formed along line 56 prior to forming the flat portions 50A, 50B.

Figure 2B:
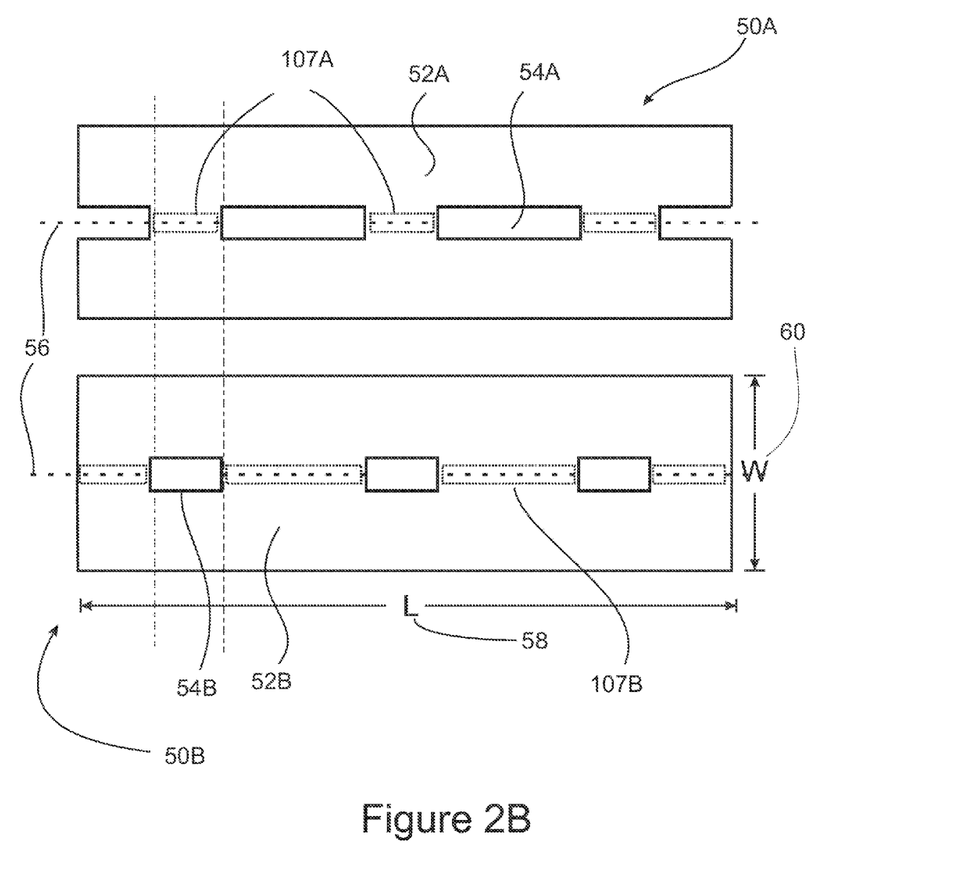
FIG. 2B is a top plan, schematic view of the two flat portions of FIG. 2A showing the eventual relationship of a hinge pin sleeve thereto.
Figure 2C:
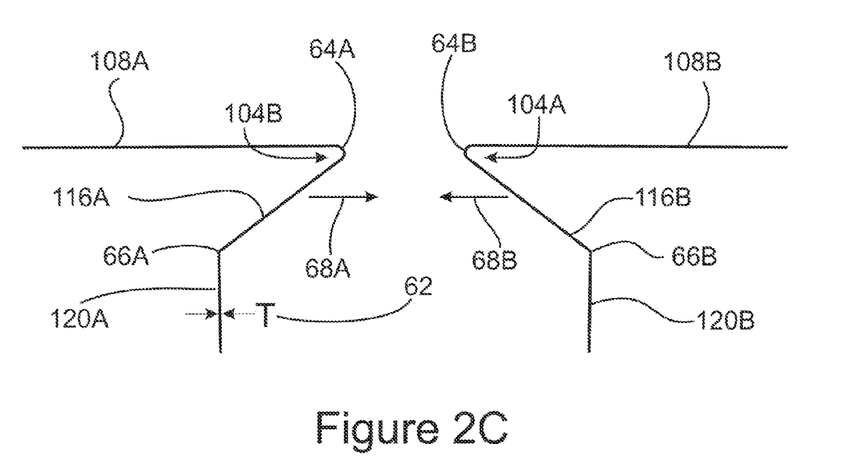
FIGS. 2C and 2D are end elevational, schematic view of the two flat portions of sheet stock after forming into the two mirror image leaves and prior to assembly of the floating hinge dock hinge in accordance with the invention.
Figure 2D:
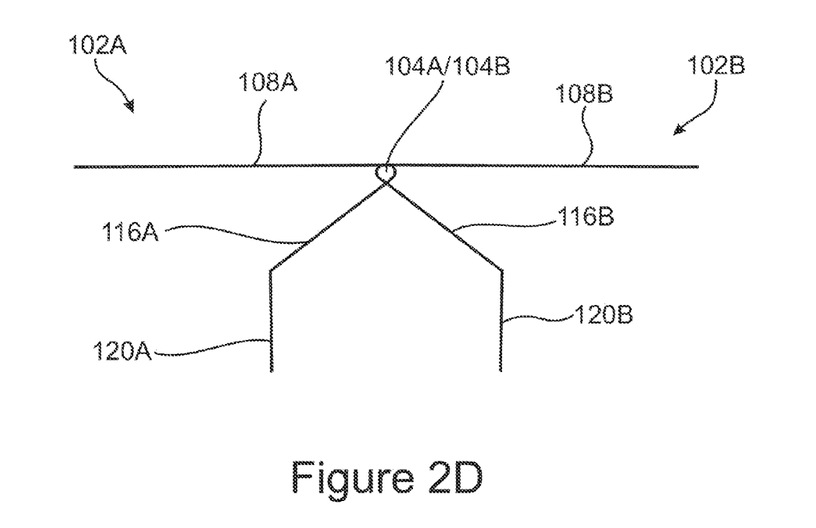

Referring now also to FIG. 2B, there is shown a top plan, schematic view of two flat portions of sheet stock 50A, 50B of FIG. 2A also showing the eventual hinge sleeve segments 107A, 107B in position relative to line 56. Hinge sleeve segments 107A, 107B are described in more detail hereinbelow.

Once openings 54A, 54B are formed in flat portions 50A, 50B are formed into hinge halves 102A, 102B. The designations of length "L" 58, width "W" 60, and thickness "T" 62 and major axis (i.e. line 56) and minor axis (i.e., width "W" 60) all pertain to hinge halves 102A 102B formed from respective flat portions 50A, 50B.

Flat portions 50A, 50B are formed from a strong material such as steel, galvanized steel, stainless steel, or aluminum. It will be recognized by those of skill in the art that other metals such as Monela® or the like may be chosen for strength and corrosion resistance. Monel® is a registered trademark of Special Metals Corporation headquartered in New Hartford, N.Y. for a Ni based metal having excellent corrosion resistance. It is particularly important that corrosion resistance be considered when the floating dock hinge will be utilized in salt water installations. Consequently, the invention is not considered limited to the materials chosen for purposes of disclosure. Rather, the invention is intended to include any and all suitable materials.

Referring now also to FIG. 2C, there is shown an end elevational, schematic view of the two flat portions of sheet stock after forming into the two mirror image hinge halves 102A, 102B, respectively but prior to assembly of the floating hinge dock hinge 100.

First bends 64A, 64B form semi-circular hinge knuckle loops 104B, 104A respectively, thereby defining flat top hinge portions 108A, 108B, respectively, and downwardly depending legs 116A, 116B, respectively. Bends 64A, 648B create an acute angle between flat top hinge portions 108A, 108B and legs 116A, 116B, respectively.

A second pair of bends 66A, 66B is made in downwardly depending legs 116A, 116B to define lower leg portions 120A, 120B that serve as vertical mounting surfaces for floating dock hinge 100 as discussed in more detail hereinbelow. After completion of bends 66A, 66B, lower leg portions 120A, 120B are substantially orthogonal to respective flat upper top portions 108A, 108B.

Hinge pin sleeve segments 107A, 107B are finally attached to semi-circular hinge knuckle loops 104B, 104A of respective hinge halves 102A, 102B in locations shown in FIG. 2B.

It will be recognized that the relative sizes of flat top portions 108A, 108B and legs 116A, 116B may be determined by moving "line" 56 up or down vertically as seen in FIGS. 2A, 2B. The vertical centerlines, not specifically identified, of openings 54A, 54B must, of course, move with any shift of "line" 56.

Referring now also to FIG. 2D, there is shown an end elevational, schematic view showing formed, hinge halves 102A, 102B assembled. Hinge halves 102A, 102B are moved toward one another as indicated by arrows 68 until semi-circular hinge knuckle loops 104A, 104B with respective hinge pin sleeve segments 107A, 107B are axially aligned. The horizontal spacing of openings 54A, 54B allow interleaving of semi-circular hinge knuckle loops 104A, 104B with a corresponding open space 54A, 54B on the opposing one of hinge halves 102A, 102B.

Figure 3:
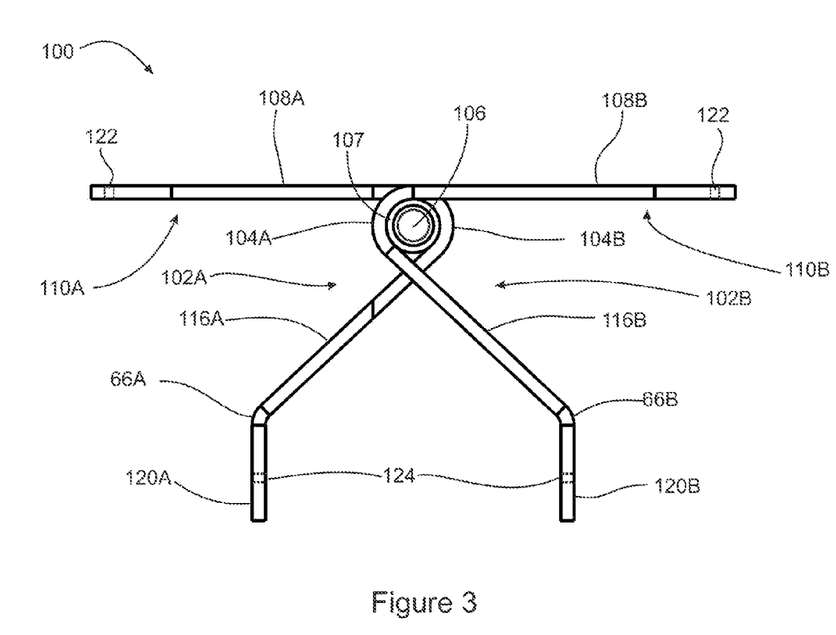
FIG. 3 is an end, cross sectional schematic view of a first embodiment of the floating dock hinge in accordance with the invention.
Figure 4:
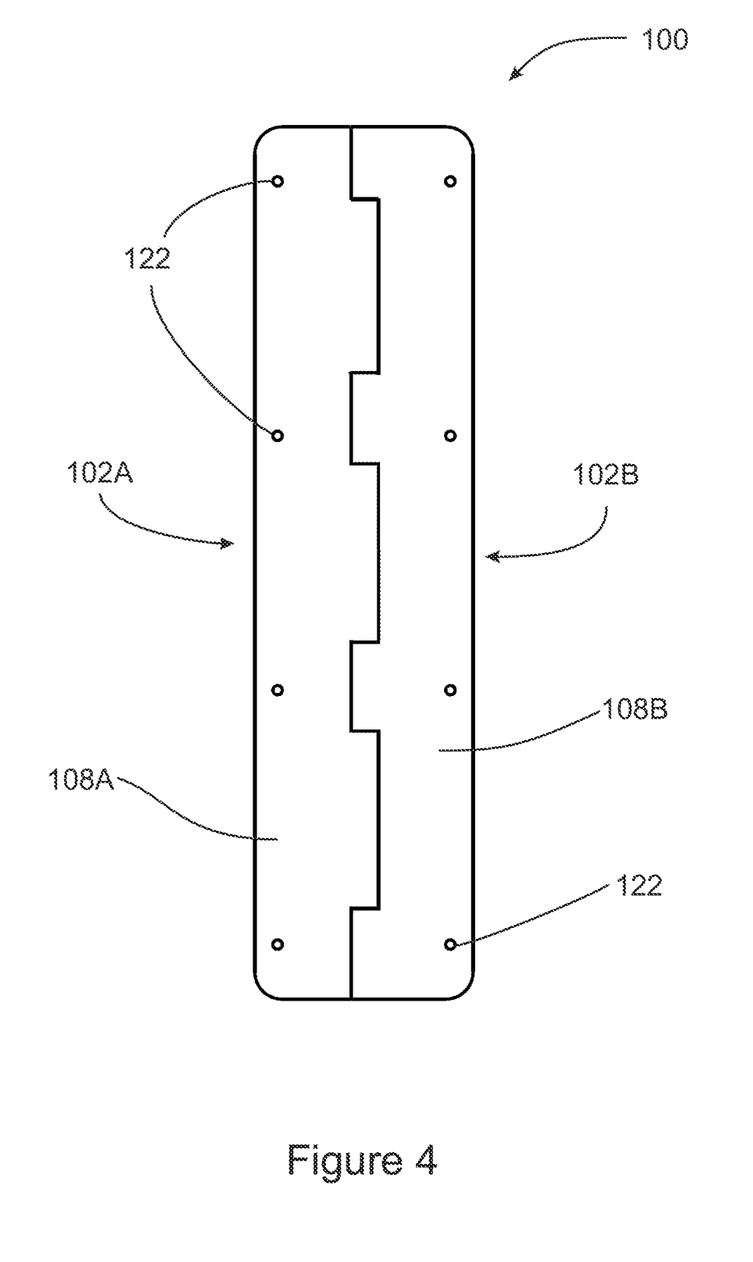
FIG. 4 is a top plan schematic view of the dock hinge of FIG. 3.

Referring now also to FIGS. 3 and 4, there are shown an end elevational and a top plan view, respectively, of a dock hinge 100 in accordance with the invention. Hinge 100 consists of two hinge halves 102A, 102B typically formed from flat sheet stock e.g., 50A, 50B). Steel, galvanized steel, and stainless steel have been found suitable for the application. When dock hinge 100 is used near salt water, a corrosion resistant material is desirable.

Hinge halves 102A, 102B are formed as mirror images of one another. Each hinge half 102A, 102B has a flat top portion 108A, 108B, with hinge halves 102A, 102B being aligned axially such that semi-circular hinge knuckle loops 104A, 104B and associated hinge pin sleeve sections 107A, 107B are in alignment. A hinge pin 106 passing through all aligned hinge pin sleeve sections hold the hinge halves together to form dock hinge 100.

Figure 7:
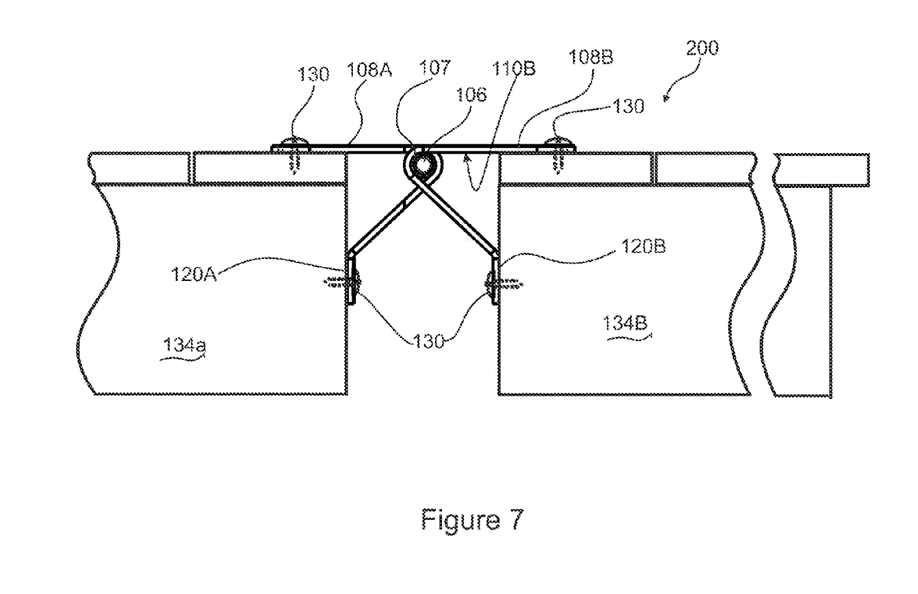
FIG. 7 is an end, sectional schematic view dock hinge of FIG. 3 connected to structures showing the intended operating environment therefor.

Through holes 122 along outer edges, not specifically identified of each of flat top portions 108A, 108B are provided to accommodate a suitable fastener, for example fasteners 130 best seen in FIG. 7, to be inserted therethrough to retain respective top flat portions 108A, 108B to a floating dock module, for example, dock portions 134A, 134B best seen in FIG. 7, or the like.

Semi-circular hinge knuckle loops 104A, 104B, respectively, depend from lower surfaces 110A, 110B of flat top portions 108A, 108B respectively adjacent respective inner edges 114A, 114B. Semi-circular hinge knuckle loops 104A, 104B defined a cavity, not specifically identified, sized and configured to receive and retain hinge pin sleeve sections 107A, 107B. When hinge knuckle loops 104A, 104B and associated hinge pin sleeve sections 107A, 107B are placed in axial alignment and hinge pin 106 is inserted therethrough, hinge halves 102A, 102B are rotatively attached one to the other and an axis of rotation is defined by hinge pin 106.

Hinge pin sleeve segments 107A, 107B are typically permanently fastened to associated ones of semi-circular hinge knuckle loops 104A, 104B, typically by welding. It will be recognized that other means for permanently securing semi-circular hinge knuckle loops 104A, 104B to associated hinge pin sleeves 107A, 107B are believed to be well known to those of skill in the art. Consequently, the invention is not considered limited to welding. Rather, the invention is intended to include are other suitable way of securing these elements.

Semi-circular hinge knuckle loops 104A, 104B continue as downwardly and outwardly directed legs 116A, 116B disposed tangentially to hinge pin 106. A bend 66A, 66B in respective legs 116A, 116B defines lower leg portions 120A, 120B. Lower leg portions 120A, 120B provide vertical mounting surfaces for dock hinge 100. It should be noted that bends 116A, 116B allow lower leg portions 120A, 120B to be orthogonal to flat top hinge portions 108A, 108B, respectively.

Through holes 124 are provided in lower leg portions 120A, 120 that serve as vertical connecting surfaces. Through holes 124 accommodate fasteners (e.g., fasteners 130, FIG. 5) to secure lower leg portions 120A, 120B to a vertical surface of an adjacent floating dock module (e.g., 134A, 134B) or the like.

Figure 5:
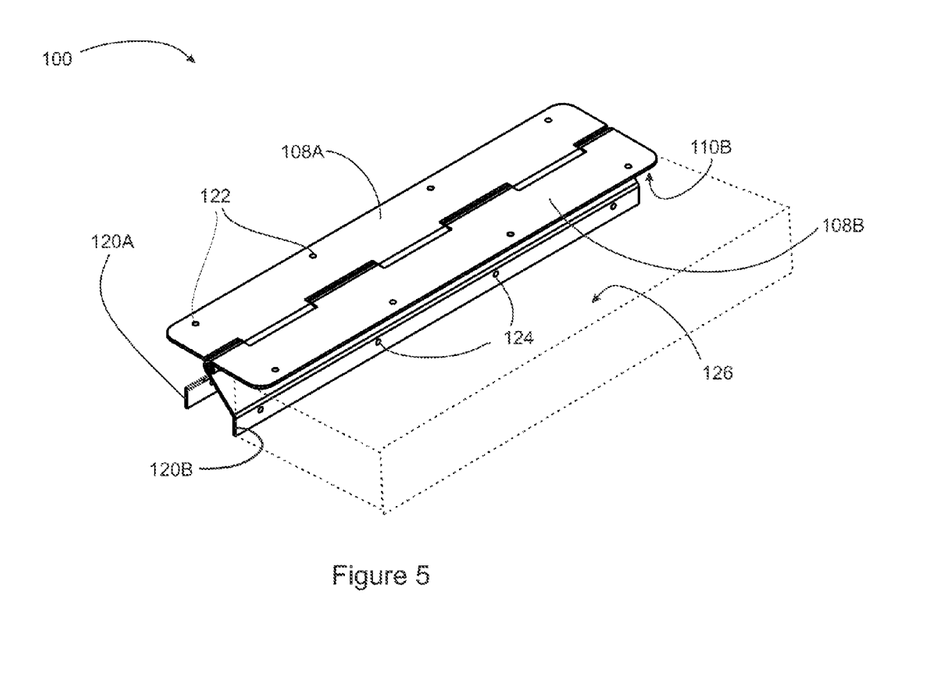
FIG. 5 is a top front perspective schematic view of the dock hinge of FIG. 3.

Referring now also to FIG. 5, there is shown a perspective view of dock hinge 100 having both top flat hinge portion 108A and lower leg portion 120A attached to a structure 126. Structure 126 forms no part of the instant invention but is shown to illustrate novel dock hinge 100 in its intended operating environment.

Fasteners 130 (best seen in FIG. 7) may be placed through top through holes 122 to hold lower surface 110B against an upper surface of structure 126 while additional fasteners 130 could be used to secure an inner surface, not specifically identified, against a vertical edge, not identified, of structure 126. This allows dock hinge 100 to be attached to structure 126 in two orthogonal planes. While not shown in FIG. 5, lower leg 120A and lower surface 110A of top flat hinge portion 108A could likewise be attached to another structure, not shown, so as to connect adjacent floating dock modules or the like to one another.

Figure 6:
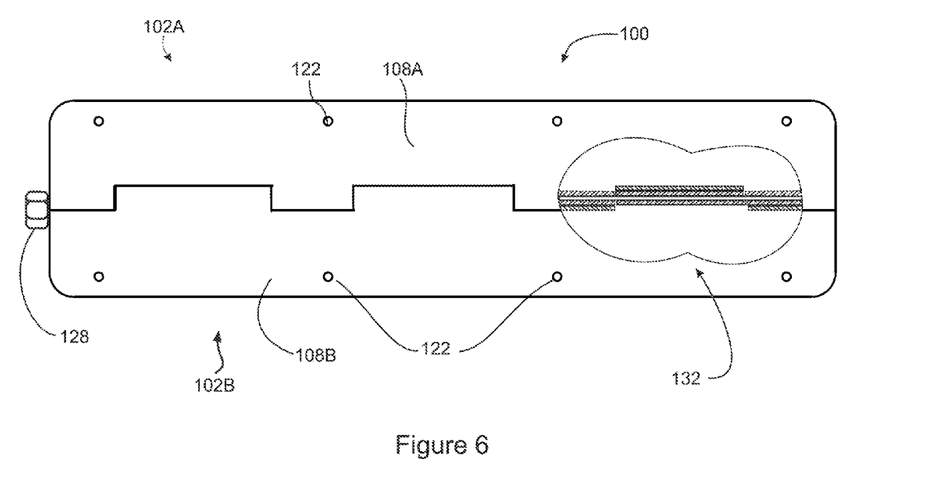
FIG. 6 is another top plan schematic view of the dock hinge of FIG. 3 having a cut away showing internal details thereof.
Figure 6A:
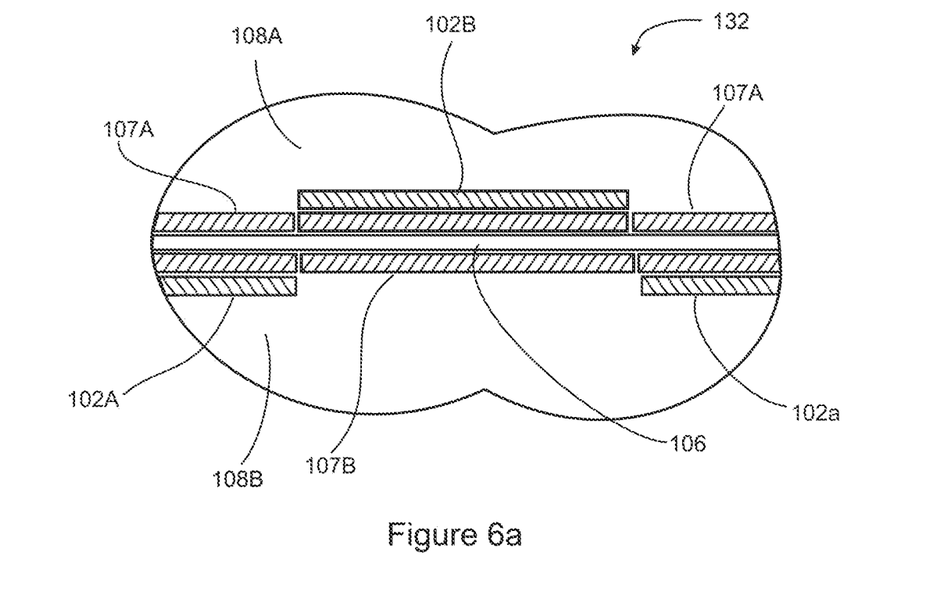
FIG. 6A is an enlarged top cross-sectional schematic view of a portion of the dock hinge of FIG. 6.

Referring now also to FIGS. 6 and 6A, there are shown a top plan view of the dock hinge 100 having a cut away region 132 showing internal details thereof and an enlarged top plan of the cut away region 132, respectively.

Hinge pin 106 retained in hinge pin sleeve segments 107 retained in semi-circular hinge knuckle loops 104A, 104B is shown holding dock hinge halves 102A, 102B together. Hinge pin 106 may be retained in dock hinge 100 by a retaining device 128. Retaining device 128 may be implemented in many ways, all believed to be known to those of skill in the art. For example, an end of hinge pin 106 may be threaded and a gland nut, not shown, such as a Nylock® nut. Nylock® is a registered trademark of Forrest Fastener of Australia. In alternate embodiments, retaining device 128 may be implemented with one or more washers and a cotter pin, neither shown. Consequently, the invention is not considered limited to a particular method or apparatus. Rather, the invention is intended to include any and all devices and methods of retaining hinge pin 106 in place in dock hinge 100. It is preferred that retaining device is removable so that sections 102A 1028 may be separated from one another when necessary. Such separation may be required for repair or storage.

In one embodiment, the hinge pin 106 ends, not specifically identified, may be axially drilled and the hole internally tapped to receive a fitment screw, not shown, one per end of hinge pin 106. When coupled with a washer, these fitment screws capture hinge pin 106 and prevent hinge pin 106 from coming out of dock hinge 100. The loss of hinge pin 106 might present only a small problem under certain conditions, but the loss of hinge pin 106 from dock hinge 100 could possibly allow one or more floating dock sections (i.e., modules) to be severed from the remainder of the floating dock and possibly float away, causing a navigational obstacle within local shipping lanes, for example.

Referring now also to FIG. 7, there is shown an end elevational view of dock assembly 200 consisting of two floating dock modules 134A, 134B (only a portion of each shown) joined by dock hinge 100. Top flat surfaces 108A, 108B of dock hinge 100 are fastened to an upper surface, not specifically identified, of respective floating dock modules 132A, 132B. Likewise, lower leg portions 120A, 120B are orthogonally attached to an edge surfaces, not specifically identified, of respective floating dock modules 134A, 134B. It should be recognized that one of the floating dock modules 134A, 134B may be a permanent fixture, such as a seawall, permanent dock, or dry land. Of course, one or both of floating dock modules may be a floating dock module needing connection and restriction of independent, uncontrolled motion.

Fasteners 130 are shown schematically as slotted, round head screws. Such round head screws provides a minimally intrusive protuberance above the upper surface of dock hinge 100. It will, however, be recognized that any suitable fastener may be substituted. Other suitable fasteners include but are not limited to lag bolts, screws with other head configurations, bolts with associated washer(s) and one or more nuts, or any other similar suitable fastener.

The design of hinge halves 102A, 102B is such that they can be produced out of two sections of flat plate steel or other material, each section then being trimmed and formed into a shape that allows attachment of the finished hinge at both the facing vertical edges between the two mating dock sections, and the horizontal surfaces of each of the two mating structures. The attachment on the horizontal surface combined with the integrated hinge increases the strength of the installation. This is accomplished by having vertical and horizontal attachment points that can evenly distribute the applied loads caused by wave and/or current forces. By distributing the forces in the x and y plane, the applied forces are more evenly transferred into the structure of the mating docks by virtue of the hinge being able to disperse the energy directly over a larger area and angle of incidence that is not constrained by a one-dimensional arrangement, wherein a certain percentage of the applied force is placed directly on the hinge retaining bolts as a function of the sine of the angle, meaning that if the force is applied in a certain direction that is in-plane to the hinge portions attachment regime, the force is not distributed properly to the dock structure and can cause failure of the hinge, either by the forced extraction of the retaining devices or the shearing of same.

The hinge is attached along the longitudinal gap between fixed and floating dock sections. A fixed dock section is generally permanently attached to either a shoreline or piling (s) that have been set into the ground below the water. A floating dock would attach to this permanent base with a hinge that allows for the motion of water to cause up and down movement of the floating section independent of the fixed portion. The fixed dock section may also be attached to the pilings with U-bolts or the like to allow the fixed section to move up and down, due to long period fluctuations in water level, such as tides coming in and going out. The floating section may consist of docking sections, walkways, or other floating devices used in the docking industry. The present invention also permits the manufacturing of the hinge assembly to be an economical manufacturing process.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A floating dock hinge, comprising:
   a) a first hinge half formed from a substantially flat stock material and having a length, a width and a thickness, said length defining a major axis, said width defining a minor axis, said flat stock material having a first set comprising at least two rectangular openings, each opening having a first width and a major axis coincident with said major axis, said first hinge half having a bend around said major axis defining a first set of semi-circular hinge knuckle loops formed along said major axis between said at least two rectangular openings, said bend separating a top, flat portion of said first hinge half and a downwardly depending leg of said first hinge half, said top, flat portion and said downwardly depending portion having an acute angle therebetween viewed along said major axis, said downwardly depending leg having an additional bend proximate a distal end thereof to define a lower leg portion between said additional bend and a distal end of said downwardly depending leg, said surface of said lower leg portion being orthogonal to said top flat lower leg portion;
   b) a second half leaf formed from a substantially flat stock material and having a length, a width and a thickness, said length defining a major axis, said width defining a minor axis, said flat stock material having a second set of openings comprising at least two second rectangular openings, each of said second rectangular openings having a second width and a major axis coincident with said major axis, said second set of at least two second rectangular openings formed along said major axis between said rectangular openings, said second hinge leaf having a bend around said major axis defining a second set of semi-circular hinge knuckle loops formed along said major axis, said bend separating a top, flat portion of said second hinge half and a downwardly depending leg of said second hinge half, said top, flat portion and said downwardly depending portion having an acute angle therebetween viewed along said major axis, said downwardly depending leg having an additional bend proximate a distal end thereof to define a lower leg portion between said additional bend and a distal end of said downwardly depending leg, said surface of said lower leg portion being orthogonal to said top flat lower leg portion, said second hinge half positioned with respect to said first hinge leaf such that said semi-circular hinge knuckle loops of said first set of semi-circular hinge knuckle loops of said first hinge leaf alternately interleave said hinge knuckle loops of said second set of hinge knuckle loops;
   c) a hinge pin sleeve section disposed in each of each semi-circular hinge knuckle loops of said first set of semi-circular hinge knuckle loops and said second sent of hinge knuckle loops, said hinge pin sleeve sections having a central longitudinal opening sized and configured to receive a hinge pin therein; and
   d) a hinge pin inserted axially through said hinge pin sleeve sections associated with interleaved, alternating semi-circular hinge knuckle loops of said first set of semi-circular hinge knuckle loops and semi-circular hinge knuckle loops of said second set of semi-circular hinge loops.

2. The floating dock hinge as recited in claim 1, further comprising:
   e) means for retaining said hinge pin within said first set of semi-circular hinge loops and said second set of semi-circular hinge loops thereby securing said first hinge leaf to said second hinge leaf.

3. The floating dock hinge as recited in claim 2, wherein said means for retaining said hinge pin within comprises at least one selected from the group: an at least partially threaded hinge pin and a nut, and at least one cotter pin with at least one washer.

4. The floating dock hinge as recited in claim 1, wherein said first width of said first set of at least two rectangular openings is approximately twice as large as said second width of said second set of at least two rectangular openings.

5. A method of forming a hinge connector, the steps comprising:
   a) forming a first metal hinge half, comprising a top flat surface, a downwardly directed leg forming an acute angle with said top flat surface, and a lower leg portion disposed orthogonally to said top flat portion, said intersection of said top flat surface and said downwardly directed leg defining a first set of semi-circular hinge knuckle loops;
   b) forming a second metal hinge half, comprising a top flat surface, a downwardly directed leg forming an acute angle with said top flat surface, and a lower leg portion disposed orthogonally to said top flat portion, said intersection of said top flat surface and said downwardly directed leg defining a second set of semi-circular hinge knuckle loops said second metal hinge half being a mirror image of said first metal hinge leaf;
   c) disposing hinge pin sleeve sections in each semi-circular hinge pin knuckle loop of said first hinge half and said second hinge half;
   d) axially aligning and interleaving said first set of semi-circular hinge knuckle loops and associated hinge pin sleeve sections and said second set of semi-circular hinge knuckle loops and associated hinge pin sleeve sections;

e) inserting a hinge pin through said axially aligned and interleaved hinge pin sleeve sections associated with said first and said second sets of semi-circular hinge knuckle loops; and f) retaining said hinge pin within said axially aligned and interleaved hinge pin sleeve sections associated with said first and said second sets of semi-circular and associated hinge knuckle loops to form a hinge.

6. The method of forming a hinge connector as recited in claim 5, wherein said retaining said substep (f) further comprised operatively attaching a retaining device to at least one selected from the group: said hinge pin, said first metal hinge half, and said second metal hinge half.

7. The method of forming a hinge connector as recited in claim 5, wherein said forming a first metal hinge half step (a) comprises forming a first metal hinge half from flat metal stock.

8. The method of forming a hinge connector as recited in claim 5, wherein said forming a first metal hinge half step (b) comprises forming a second metal hinge half from flat metal stock.

9. The method of forming a hinge connector as recited in claim 5, the steps further comprising:

f) prior to said axially aligning and interleaving step (c), forming mounting holes adjacent at least one edge parallel to a major axis of at least one of said first metal hinge leaf and said second metal hinge leaf.

10. A method of hingedly connecting two floating dock modules, the steps comprising:

a) providing a floating dock hinge comprising two hinge halves, each comprising a flat top surface and a lower leg having a surface orthogonal to said flat top surface, said two hinge halves being rotatively joined one to another by a hinge pin;

b) fastening said top flat surface of a first of said two hinge halves to an upward-facing surface of a first floating dock module;

c) fastening said lower leg of a first of said two hinge halves to a vertical edge surface of said first floating dock module;

d) fastening said top flat surface of a second of said two hinge halves to an upward-facing surface of a second floating dock module; and e) fastening said lower leg of a second of said two hinge halves to a vertical edge surface of said second floating dock module.

11. The method of hingedly connecting two floating dock modules as recited in claim 10, wherein said providing step (a) comprises providing a floating dock hinge wherein said hinge pin is removable to facilitate selectively separating said first floating dock module from said second floating dock module.

* * * * *